P. A. WICKES & S. B. GORBUTT.
CABLE WINDING MACHINERY.
APPLICATION FILED JULY 5, 1917.
1,260,614.
Patented Mar. 26, 1918.
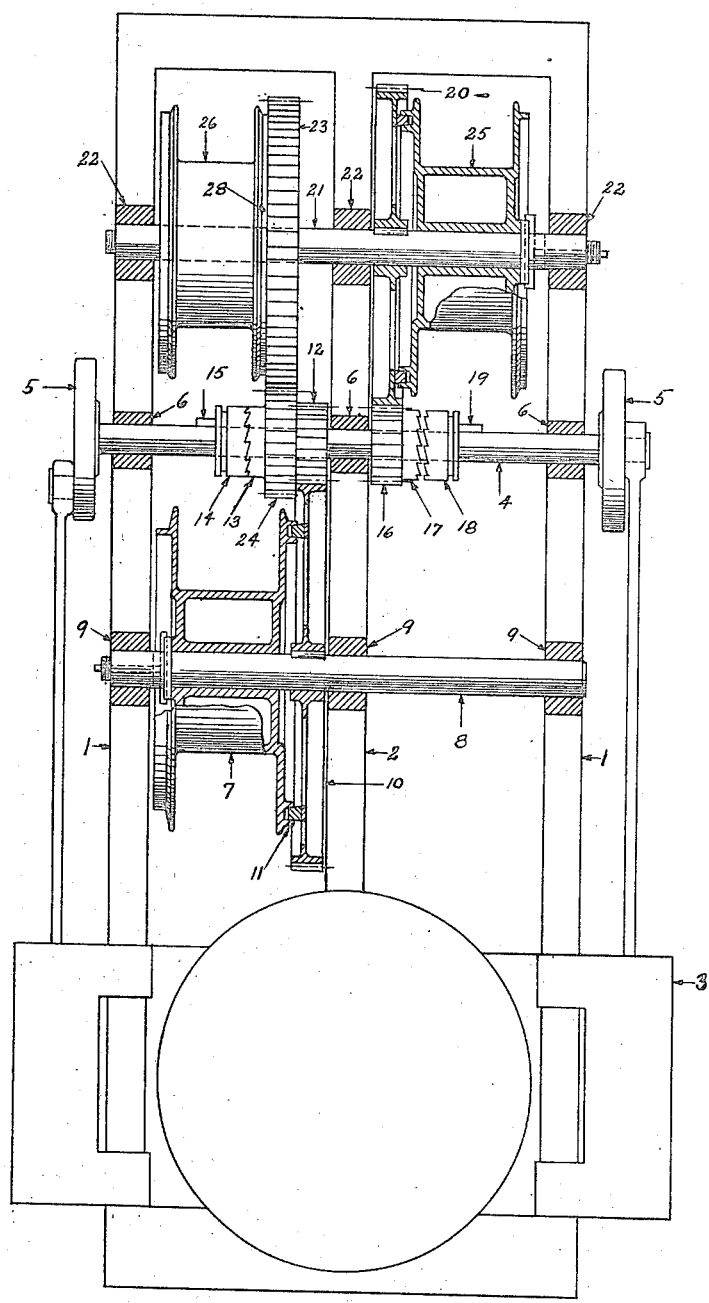

UNITED STATES PATENT OFFICE.

POWERS A. WICKES AND SIDNEY B. GORBUTT, OF PORTLAND, OREGON.

CABLE-WINDING MACHINERY.

1,260,614.  Specification of Letters Patent.  Patented Mar. 26, 1918.

Application filed July 5, 1917. Serial No. 178,545.

*To all whom it may concern:*

Be it known that we, POWERS A. WICKES, a citizen of the United States, and SIDNEY B. GORBUTT, a subject of the King of Great Britain, residing at Portland, in the county of Multnomah and State of Oregon, have invented new and useful Improvements in Cable-Winding Machinery, of which the following is a specification.

This invention relates to cable winding machinery and consists in certain improvements in the construction thereof as will be hereinafter fully described and pointed out in the claims.

The object of the invention is to provide a machine of this type with a gearing which will give different speeds to the winding drums.

The invention is illustrated in the accompanying drawing wherein 1—1 mark the side frames, 2 a central beam, 3 the engine secured to the frame, 4 the drive shaft, and 5 cranks mounted on the drive shaft and forming part of the engine. The drive shaft is mounted in the bearings 6—6—6 on the beams 1 and 2.

A drum 7 is mounted on a shaft 8. The shaft 8 is journaled in the bearings 9—9—9 on the beams 1 and 2. The drum 7 is driven by a gear 10 through a friction clutch 11 in the usual manner.

A gear 12 is loosely mounted on the shaft 4 and meshes the gear 10. The gear 12 carries a clutch member 13 which is adapted to operate with a clutch member 14. The clutch member 14 is slidingly mounted on the shaft 4 and locked against rotation by a spline 15.

It will readily be seen that when the clutch members 13 and 14 are in engagement the gear 10 is driven from the gear 12 and the drum 7 given a speed fixed by the gear ratio between the gears 10 and 12.

A gear 16 is loosely mounted on the shaft 4. It carries a clutch member 17 which is adapted to engage the clutch member 18. The clutch member 18 is slidingly mounted on the shaft 4 and locked against rotation by a spline 19. The gear 16 meshes a gear 20. The gear 20 is fixed on a shaft 21. The shaft 21 is journaled in the bearings 22—22—22 on the beams 1 and 2. A gear 23 is also fixed on the shaft 21 and meshes a gear 24. The gear 24 is mounted on the shaft 4 and connected with the gear 12 and preferably formed integrally with the gear 12.

By disengaging the clutch members 13 and 14 and throwing the clutch member 18 into engagement with the clutch member 17 the gear 12 instead of being directly driven by the shaft 4 is driven through the gear and connection made up of the gears 16, 20, 23 and 24. The gear 16 is smaller than the gear 24 and the gear 23 smaller than the gear 20 and consequently the gear ratio through the connection gives to the gear 12 a slower speed than when the gear 12 is directly connected with the shaft 4. Consequently the drum 7 with this connection in action is given a slower speed.

Preferably the shaft 21 is used for a mounting for the auxiliary drums 25 and 26, the drum 25 being provided with a friction clutch 27 by means of which it may be locked with the gear 20 in the usual manner and the drum 26 with a friction clutch 28 by means of which it may be locked with the gear 23 in the usual manner.

It will be noted that all of these drums rotate in the same direction at approximately the same level and that the bearings may be readily mounted on an ordinary one-level frame. The driving gears are arranged between the drums so that the shafts may extend entirely across the frame and permit of a central beam extending through the frame giving to the shafts three bearings.

The arrangement of the drums permits the beams 1 and 2 to be braced laterally near the center.

It will be noted that the change of speed provided by this gearing not only changes the speed of the drum 7 but also changes the speed of the drums 25 and 26. This is accomplished by reason of the fact that there is a different gear ratio between the gears 16 and 17 and the gears 24 and 23 so that when the drum 7 is speeded up the drums 5 and 6 are also given a greater speed.

What is claimed as new is:—

1. In cable winding machinery, the combination of a driving shaft; a drum shaft; a drum gear on the drum shaft; a first gear on the driving shaft meshing the drum gear; means for locking and releasing the first gear with and from the drive shaft; a second gear on the drive shaft connected with the first gear; a gear connection between the drive shaft and the second gear having a gear ratio varying the speed of the second gear from that of the drive shaft; and means for throwing into and out of action the gear connection.

2. In cable winding machinery, the combination of a driving shaft; a first drum shaft; a first drum on the drum shaft; a first gear on the first drum shaft; a second gear on the driving shaft meshing the first gear; means for locking and releasing the second gear with and from the drive shaft; a second drum shaft; a third gear mounted on the drive shaft; means for locking and releasing said third gear with and from the drive shaft; a fourth gear on the second drum shaft meshing the third gear; a fifth gear on the second drum shaft; and a sixth gear on the drive shaft connected with the second gear, the gear ratio through the third, fourth, fifth and sixth gears giving to the sixth gear a different speed than the drive shaft.

3. In cable winding machinery, the combination of a driving shaft; a first drum shaft; a first drum on the drum shaft; a first gear on the first drum shaft; a second gear on the driving shaft meshing the first gear; means for locking and releasing the second gear with and from the drive shaft; a second drum shaft; a third gear mounted on the drive shaft; means for locking and releasing said third gear with and from the drive shaft; a fourth gear on the second drum shaft meshing the third gear; a fifth gear on the second drum shaft; a sixth gear on the drive shaft meshing the fifth gear on the second drum shaft and connected with the second gear, the gear ratio through the third, fourth, fifth and sixth gears giving to the sixth gear a different speed than the drive shaft; a second drum on the second drum shaft; and means for connecting said second drum with one of the gears on the second drum shaft.

4. In cable winding machinery, the combination of a driving shaft; a first drum shaft; a first drum on the drum shaft; a first gear on the first drum shaft; a second gear on the driving shaft meshing the first gear; means for locking and releasing the second gear with and from the drive shaft; a second drum shaft; a third gear mounted on the drive shaft; means for locking and releasing said third gear with and from the drive shaft; a fourth gear on the second drum shaft meshing the third gear; a fifth gear on the second drum shaft; a sixth gear on the drive shaft meshing the fifth gear on the second drum shaft and connected with the second gear, the gear ratio through the third, fourth, fifth and sixth gears giving to the sixth gear a different speed than the drive shaft; two drums on the second drum shaft; and means for connecting said drums with the gears on the second drum shaft.

5. In cable winding machinery, the combination of a first drum shaft; a second drum shaft; a drive shaft arranged between the first and second drum shafts and parallel therewith; a first drum on the first drum shaft; a second drum on the second drum shaft; a first gear on the first drum shaft for driving the first drum; a second gear on the drive shaft meshing the first gear; means for locking and releasing said second gear with and from the drive shaft; a third gear on the drive shaft; means for locking and releasing the third gear with and from the drive shaft; a fourth gear on the second drum shaft; a fifth gear on the second drum shaft; a sixth gear on the drive shaft meshing the fifth gear on the second drum shaft and connected with the second gear, the gear ratio through the third, fourth, fifth and sixth gears giving to the sixth gear a different speed than that of the drive shaft; and means for driving the second drum from one of the gears on the second drum shaft.

6. In a cable winding machine, the combination of a driving shaft; a first drum shaft; a second drum shaft; a first drum on the first drum shaft; a second drum on the second drum shaft; a gear connection between the driving shaft and the first drum; a gear connection between the second drum and the driving shaft; an indirect connection between the first drum and the driving shaft through the gear connection between the driving shaft and the second drum; and means for shifting said gear connections varying the gear ratio between both drums and the driving shaft.

7. In a cable winding machine, the combination of a driving shaft; a first drum shaft; a second drum shaft; a first drum on the first drum shaft; a second drum on the second drum shaft; a first gear on the drive shaft; a second gear on said first drum shaft meshing the first gear on the driving shaft; a third gear on the driving shaft; a fourth gear on the second drum shaft; a fifth gear on the second drum shaft; a sixth gear on the driving shaft meshing the fifth gear on the second drum shaft, said sixth gear and first gear being fixed with relation to each other; clutch mechanisms for locking and releasing the third gear with and from the driving shaft and a second clutch mechanism for locking and releasing the first and sixth gears with and from the driving shaft, said gears having gear ratios giving to both drums a different speed when the second and sixth gears are locked with the shaft than when the third gear is locked with the driving shaft.

In testimony whereof we have hereunto set our hands.

POWERS A. WICKES.
SIDNEY B. GORBUTT.

Copies of this patent may be obtained for five cents each, by addressing the "Commissioner of Patents, Washington, D. C."